June 23, 1953

A. H. LONG 2,642,663

MEASURING AND CUTOFF MACHINE

Filed Dec. 8, 1949

INVENTOR.
ARTHUR H. LONG
BY *William D. Carothers*

HIS ATTORNEY.

INVENTOR.
ARTHUR H. LONG
BY
William D Carothers
HIS ATTORNEY

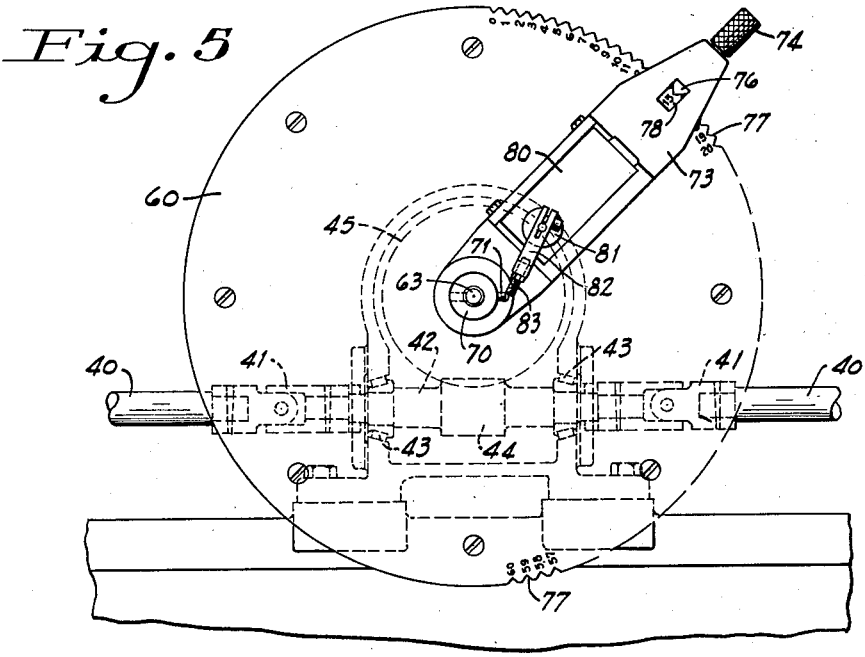

June 23, 1953 A. H. LONG 2,642,663
MEASURING AND CUTOFF MACHINE
Filed Dec. 8, 1949 4 Sheets-Sheet 4

INVENTOR.
ARTHUR H. LONG
BY *William D. Carothers*
HIS ATTORNEY

Patented June 23, 1953

2,642,663

UNITED STATES PATENT OFFICE 2,642,663

MEASURING AND CUTOFF MACHINE

Arthur H. Long, Pittsburgh, Pa., assignor to Wm. K. Stamets Company, Pittsburgh, Pa., a corporation of Pennsylvania Application December 8, 1949, Serial No. 131,739

9 Claims. (Cl. 33—132)

This invention relates to a machine for measuring and cutting off lengths of linear material such as strip, bar stock, pipe or other material generally measured and cut in linear lengths.

The lengths of material such as pipe are moved longitudinally along a table to a measuring device where it strikes a flag switch which causes its travel speed to be reduced and then the pipe strikes a bumper that initiates a circuit causing the pipe to become engaged by a measuring roll that rotates an electromagnetic means to measure off a predetermined pipe length as it proceeds to a cutoff machine. When the pinch roll engages the pipe, the electromagnet becomes energized and attracts a tripping mechanism that rotates with the magnet until the pipe has traveled a predetermined distance in measuring off a specific length, at which time the tripping mechanism is energized causing the pipe to be clamped in a vise which in turn opens the measuring pinch roll and starts the cutoff machine. The cutoff machine functions to automatically retract the cutters when the pipe is cut off and then move the cut length of pipe at high speed from the cutting machine and initiate an index to feed another section of pipe in its place for cutting.

This machine is also employed for measuring and cutting off the crop ends of a pipe, bar stock or other similar articles at a predetermined distance from its end.

Other objects and advantages appear in the following description and claims.

The accompanying drawings show, for the purpose of exemplification without limiting the invention or claims thereto, certain practical embodiments of the invention wherein:

Fig. 5 is an enlarged view in front elevation of the target and the scanning disc of the measuring device;

Fig. 6 is a sectional view taken through the axis of rotation of the scanning disc;

Figure 1:
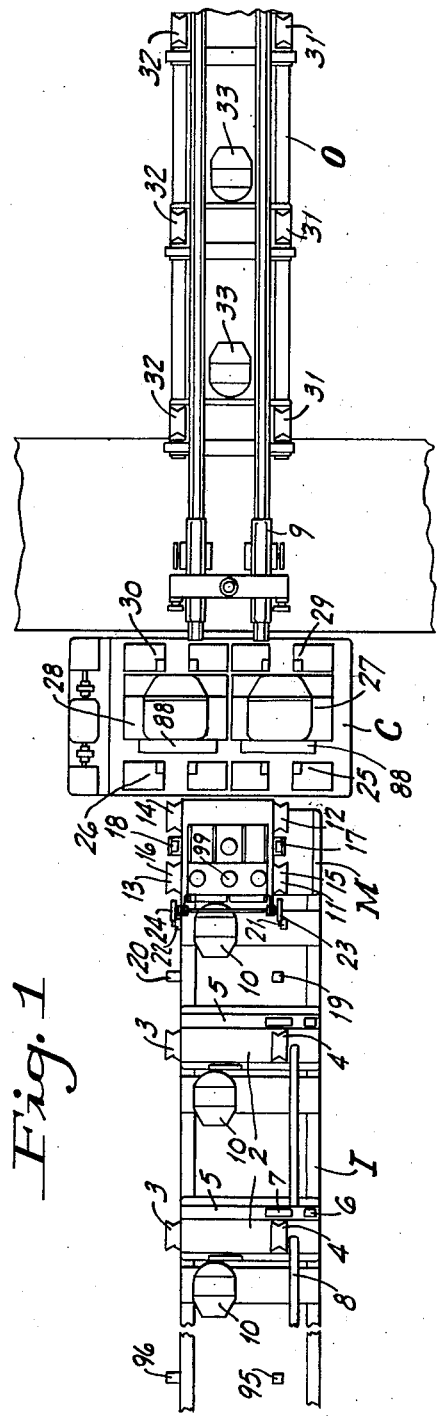
Fig. 1 is a plan view of a mill layout showing the relative position of the measuring device and the cutoff machine.

Referring first to Fig. 1, the tube measuring device and cutoff machine are shown intermediate of the inlet table and outlet table. The inlet table is marked I and the outlet table is marked O and the measuring device is indicated at M and the cutoff machine is indicated at C. The inlet table is made up of a series of stands 2, each having a pipe feeding roll 3 and 4 journaled therein and provided with an automatic feeding device, indicated by the alternately actuating elevators 6 and 7 which are operated from a common lever attached to the shaft 8 and operated by suitable means such as a fluid cylinder which oscillates the shaft to alternately raise the elevator members 6 and 7 above the skid surface 5 for conveying tubes from a series of rollers 4 to a series of rollers 3, from whence the tube is moved longitudinally by rotating the series of rolls 3 and 4 by their respective motors 10. Both of the motors 10 are energized through a single control to operate them in unison at their high or low speed, or to stop them, which control may be readily and accurately determined.

Figure 2:
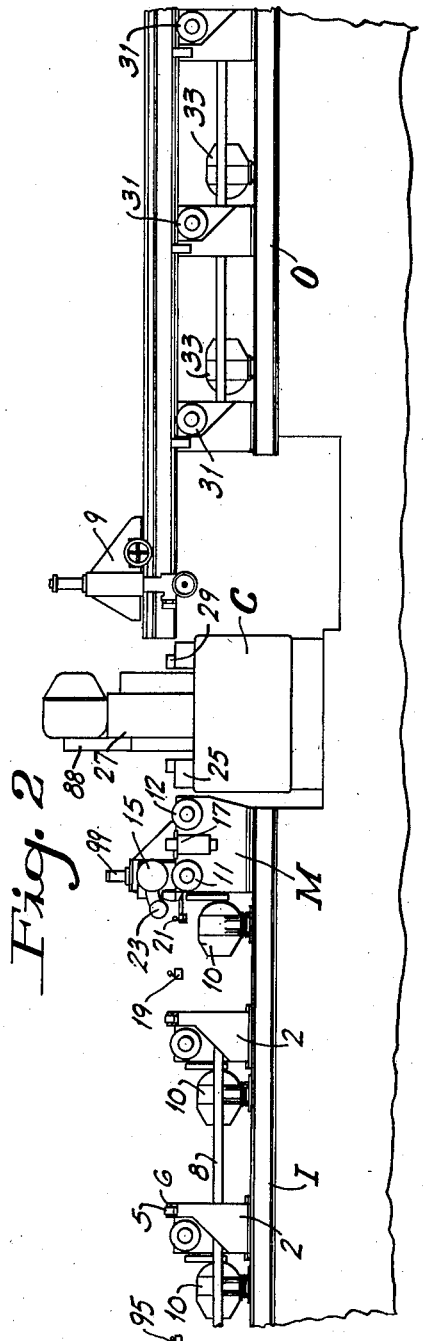
Fig. 2 is a view in side elevation of the structure shown in Fig. 1.
Figure 3:
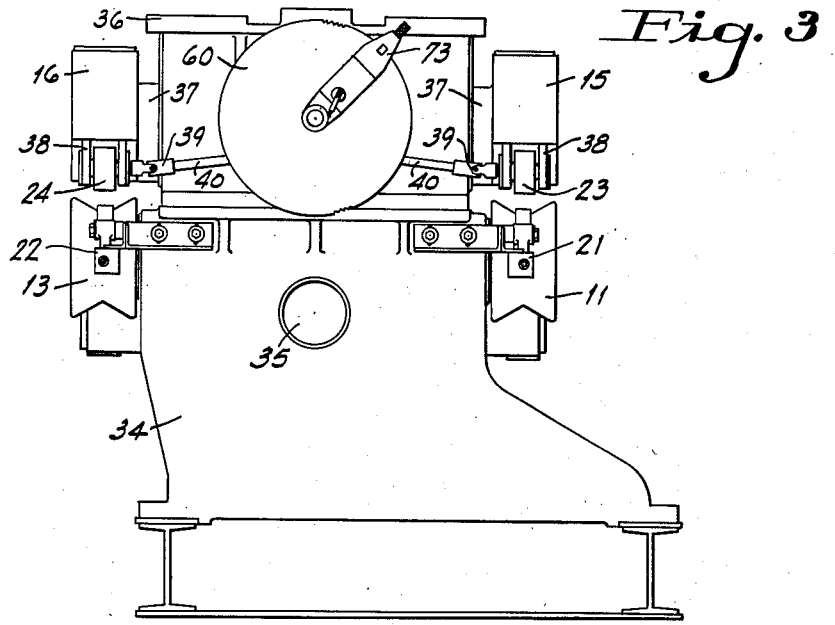
Fig. 3 is a view in front elevation of the measuring machine.

The measuring device M consists of two sets of feed rolls 11 and 12, 13 and 14, together with the idler pinch rolls 15 and 16 that are above the rolls 11 and 13. When the tubing is moved longitudinally to the rolls 11 and 13, stops 17 and 18 are raised by a single crosshead so as to be placed in the path of the tubing in each line causing it to stop. When the front end of the tubing engages and passes over the switches 19 and 20, all of the motors 10 are reduced in speed. Just before the end of the tubing strikes the stops 17 and 18, it also strikes the switches 21 and 22 which further reduces the speed of the motors 10 to substantially nil with just enough voltage thereon to maintain the tube against the stops 17 and 18, but prevent the rolls from turning under the weight of the tubing. The sequential operation of the switches will be discussed later; however, the pinch rolls 15 and 16 are caused to be lowered when the tubing strikes the stop and since the measuring rolls 23 and 24 are mounted on the same crosshead, they all come down at the same time. Both the idler pinch rolls 15 and 16 and the measuring rolls 23 and 24 engage the upper surface of the tubing when the stops 17 and 18 are retracted and the tubes continue on their forward pass through the fore gripping jaws 25 and 26 and through the cutoff machines 27 and 28 and the aft gripping jaws 29 and 30 to the outlet table illustrated by the sets of rolls 31 and 32 driven by the motors 33 in a manner very similar to that of the inlet table. When the tube passes on to the outlet table, its crop end will proceed a predetermined distance determined by the measuring device M, which stops the motors 10 and 33 and the rolls whereupon the fore and aft clamping jaws 25, 26, 29 and 30 close on their respective tubes and the cutoff machines 27 and 28 cut the predetermined crop end of pipe from the tubing. When the cutters have cut through the pipe, they are retracted to their original position which trips a switch to open the fore and aft chucks and start the table motors 10. The cropped end slides down a chute onto a conveyor as shown in Fig. 2. The motors 33 are speeded up to quickly take the cut section of pipe away from the cutoff machine. The measuring device may be set to again measure the next section of pipe which proceeds through the cutoff machine to the outlet table. However, the to-length gauge 9, which is adjustable along the outlet table, functions to stop the tubing at a predetermined distance for multiple lengths after cropping and it initiates the operation of the cutoff machine. The outlet table carries the cut sections of pipe to a predetermined distance determined by a series of switches, after which time they are raised from their respective rolls and are discharged laterally to a storage bin.

The measuring device is shown more in detail in Figs. 3 to 6 wherein the base 34 is provided with an opening 35 to receive the drive shaft from the motor 10 for the purpose of extending into the base and rotating the feed rolls 11 and 12, 13 and 14. The motor 10 that is mounted adjacent the measuring device for this purpose is constructed in the same manner as the other table motors and is operated by the same controls as the other inlet table motors 10. Thus, the feed rolls 11 and 12 are aligned with the series of rollers 4 on the inlet table and the feed rollers 13 and 14 are aligned with the series of table rollers 3 of the inlet table.

The base 34 is provided with an upper casting 36 that houses a crosshead 37 that extends from one side of the casting to the other and supports the pinch rolls 15 and 16 and the measuring rolls 23 and 24. The pinch rolls 15 and 16 are idler rolls journaled on bearings supported by the crosshead 37. This crosshead also has rearwardly extending flanges 38 on each side thereof in which the measuring rolls 23 and 24 are journaled. The shafts of the measuring rolls extend inwardly and are provided with universal joints 39 which connect them to the shaft 40 provided with a second set of universal joints 41, as shown in Fig. 5, which in turn are connected to the intermediate shaft 42 housed in the bearings 43 and having a worm 44 secured intermediate the ends thereof. The worm 44 is in mesh with the worm gear 45, as shown in Fig. 6, carried by the shaft 46 journaled in the bearings 47, one of which is supported in the housing 48 and the other in a bearing carrier plate 49 carried by the housing 48. The worm gear shaft 46 extends into the annular housing 50 and has secured thereto the annular ring type magnet 51 which has opposed spaced annular pole faces 52, 53 in the form of circular discs that provide the pole faces of the magnetic gap of the electromagnetic coil 54. The electromagnetic coil 54 is electrically connected to the collecting rings 55 and 56 on the back of the annular electromagnetic member 51 and are engaged by the spring biased brushes 57 and 58 held by the insulator 59 on the back of the housing 48. This electromagnetic coil 54 is connected by the wire leads to a suitable electric current such as a direct current or rectified current as the coil 54 is designed to operate, in this particular instance, on direct current.

The annular cylindrical housing 50 is closed by the annular disc 60 on the front thereof, which disc is provided with an outwardly extending sleeve 61 that carries the bearings 62 therein for the purpose of rotatably supporting the shaft 63. The inner end of the shaft 63 is provided with a pendulum member 64, the hub of which is secured to the shaft and which extends radially outwardly to a point opposite the air gap formed by the annular discs or magnetic pole faces 52 and 53. The outer end of the pendulum 64 is provided with a transverse opening to receive the pin 65 having a flat head 66, the pin preferably being made of nonmagnetic material, but the head being made of magnetic material. Thus, when the coil 54 is energized, it will attract the outer end of the pin and cause the pendulum to rotate with the coil. A socket is provided adjacent the hub of the pendulum to receive the ball 67 and the spring 68 which forces the same against the inner face of the cover 60, there being an indentation 69 below the hub of the pendulum in the surface of the plate to receive the ball 67 for the purpose of damping the free movement of the pendulum and locating it for the initial or starting position after it falls by gravity from any position to the bottom of the casing when released by the magnet.

The shaft 63 extends out of the sleeve 61 and is provided with a collar 70 having a transverse pin 71. The outer portion of the sleeve 61 is arranged to receive the hub 72 of the scanner arm 73 and is held in place by the ring 72a. The scanner arm 73 is not only journaled on the sleeve 61, but may rotate through 360° thereon. The outer end of the scanner arm 73 is provided with a knurled nob 74 secured to the stem 75 which has an indicating lug 76 on its inner end in the shape of a V for being received in the notches 77 shown around the perimeter of the plate 60. The indicator 76 is biased to receive and hold the scanner arm 73 at any given position when inserted in one of the notches 77 about the periphery of the plate 60. A small window 78 is provided in the scanner arm to view a figure corresponding to the notch on the perimeter of the disc 60, which numeral indicates the number of inches or length that a tube extends from the cutters in the cutoff machine. It will be noted that the particular device shown has a notch every half inch. Thus, the pipe being severed by this cutoff machine can be cut in lengths of one-half inch. These notches may be made at any desired fraction of an inch.

The scanner arm is provided with a microswitch, indicated at 80, which is provided with an operating shaft 81 on which is clamped the actuating arm 82 of the adjustable trigger 83 that may be engaged by the pin 71 for the purpose of operating the switch 80 in initiating an electrical circuit, which, in this instance, causes the vise or the fore and aft clamp members on the cutoff machine to engage and clamp the pipe in position, which in turn starts the cutting machine and also stops the motors 10.

Thus, upon setting the scanner arm at any selected position around the perimeter of the disc 60, the measuring device when energized will permit the tube to move longitudinally into the cutting machine to a predetermined distance and the pendulum is taken around by the magnet until the switch 80 is actuated according to the selection of the scanner arm, at which time the jaws of the vise will close on the tubing and the table rolls will cease to rotate, permitting the cutting machine to function for the purpose of cutting off predetermined lengths of pipe. Although the indication on the perimeter of the disc 60 shows only sixty inches, it is obvious that this scale may continue around the periphery and also function in multiples thereof. In other words, if it is desired to run a pipe considerably longer than the scale on the annular disc 60, the same may be accomplished by means of a relay which permits the microswitch 80 to operate one or more times before it will actually be effective in stopping the table motors and close the chucks for the purpose of cutting off tubing.

Figure 7:
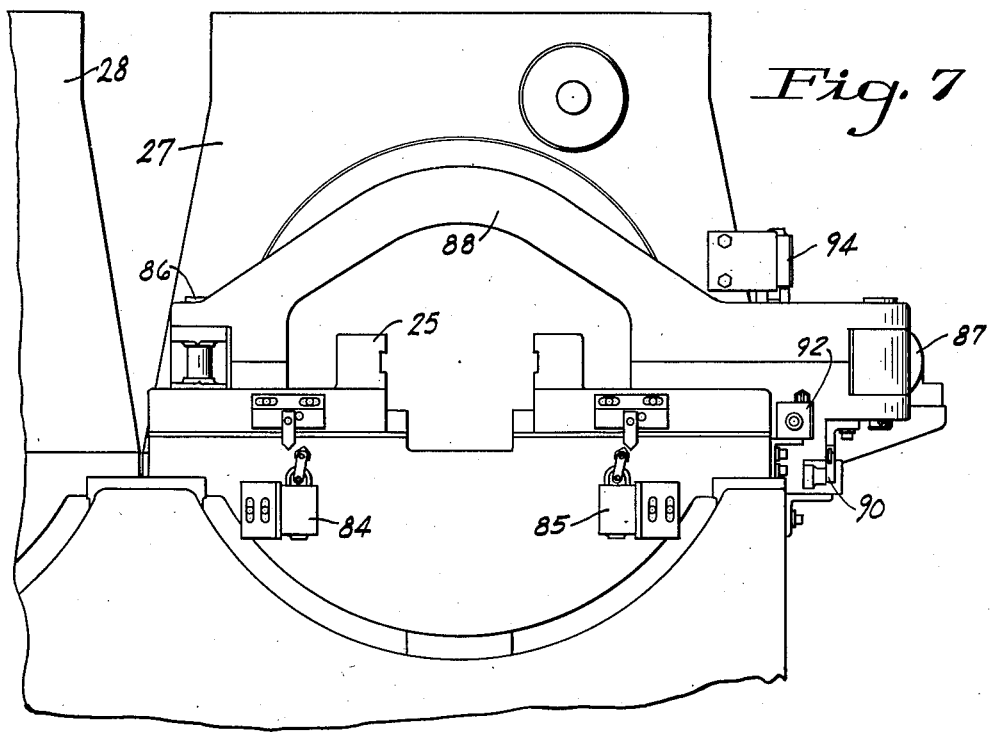
Fig. 7 is a front elevation of a dual cutoff machine shown in Fig. 1.
Figure 8:
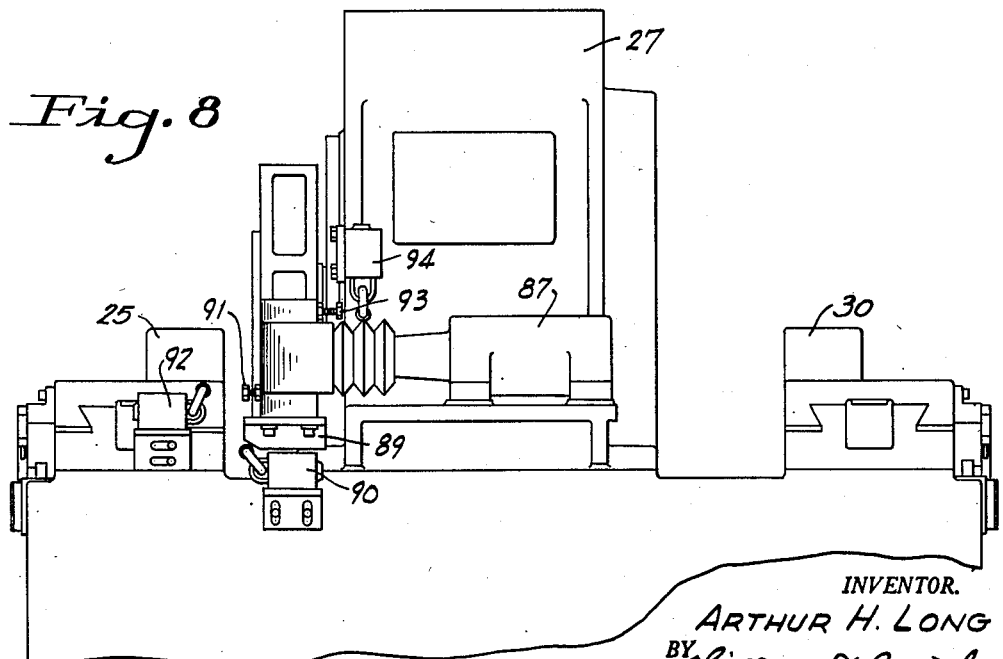
Fig. 8 is a side elevation of the dual cutoff machine shown in Fig. 1.

Referring specifically to Figs. 7 and 8, it will be noted that each of the cutoff machines 27 and 28 is provided with mechanically actuated switches 84 and 85 that are operated by bracket cams carried on the slide of the chuck jaws 25 and 26. The switch 84 is actuated upon the closing of the jaws 25 of the chuck on the cutoff machine to initiate the cutoff feed and rapid traverse and also to lift the pinch rolls and set up the multiple stop 9 of the outlet table to receive the pipe continuing through the mill. The switch 85 normally functions when the jaws open, after the tube has been cut off and closes a circuit to start the table motors and convey the tubes from the inlet table through the cut-off machine to the multiple stop 9.

The feed of the cutoff machine is actuated by the hydraulic servomotor 87, as shown in Fig. 8, which functions to move the clutch yoke 88 on its pivot pin 86 and thereby feed the cutting tools (not shown) radially of the pipe to cut off the same. In view of the fact that the cutoff machine is not, per se, a portion of this invention, but is disclosed in application, Serial No. 131,740, the further details of this machine are not disclosed or otherwise described, as substantially any kind of cutoff machine could be employed in the place of that shown. Once the rapid traverse has been initiated on the feed of the cutoff machine the yoke will rapidly move the cutters into cutting position, at which time the speed of the hydraulic servomotor 87 will be reduced to cutting speed until the tube is completely severed, then the cutting tools are automatically retracted by the retraction of the clutch yoke 88 in the hydraulic servomotor 87 reversing the stroke thereof.

The hydraulic feed moves the yoke to the left, as shown in Fig. 8. The cam 89 functions to operate the switch 90, which is a normally opened switch, for the purpose of providing a slow selected feed as this switch and cam are set relative to one another so that when the cutters are about to engage the pipe the feed will be materially reduced to the hydraulic servomotor 87.

When the clutch yoke approaches its extreme position in moving the cutter bars to completely sever the pipe, the stop 91 engages the switch 92 which performs two functions, this switch having a normally closed circuit and a normally open circuit. The normally closed circuit, when open by engagement of the stop 91, opens the feed to the hydraulic servomotor 87 and thereby stops the hydraulic feed to the yoke 88. The switch 92 also closes another circuit to reverse the solenoid and hydraulic servomotor 87 to rapidly retract the cutters. As the yoke returns to its original position in retracting the cutting members, the stop 93 engages the switch 94 to open the circuit to the solenoid that was closed by the switch 92 and also to open the chucks 25 and 26, 29 and 30 on both ends of the cutoff machine. This permits the severed tubing to be free and also initiates the circuit for starting up the table motors 10 and 33 to move the severed pipe out of the machine and the next section into the machine. As previously stated, the motors 33 operate at a faster speed to remove the severed section of pipe at a faster rate than motors 10 of the inlet table in conducting the pipe to the cutoff machine.

Although the switches and the structure of the machine have been described with reference to one cutoff machine, it is obvious that the machine disclosed is a dual machine for measuring and cutting off the work in unison, the electric circuits being checked through the same switches on both sides of the dual machine so as to be sure of the complete performance of each step by one-half of the machine before the next proceeding step is initiated.

When this invention is employed at the end of a tube mill, the tubes are ordinarily received on skids where they had previously been placed by a kickoff machine from a straightener outlet conveyor. The tubes then roll by gravity to stops at the inlet table of the cutoff machine line. A selector is then actuated to provide that the tubes may be loaded on the near side of the table on the rolls 4 or on the far side of the table on the rolls 3 or on both sides so that the tubes may be selectively cut off on either side or in dual lines simultaneously. The master and selective switches, which function to select one or both of these lines, carry their control lines throughout the circuit in order that the machines are properly interlocked when functioning together or one is unlocked from the other when functioning alone.

When the tubes are received on the storage skids, they are permitted to be indexed to the inlet table. When the tubes lie on the inlet table they close a flag switch 95 which initiates the movement of the machine, the flag switch being mounted on the bed of the inlet conveyor table and operated by the tubes in line on the series of rollers 3 and 4. These flag switches indicate when the line is clear of tubes and initiate the operation of the index device for supplying the tubes thereto. The indexing device, in supplying the tubes to the lines represented by the series of rollers 3 and 4, will remain idle until such time as the flag switch 95 is actuated when the tube passes off the same and permits it to rise and close its circuit, thereby initiating the supply of another tube through the indexing device to the inlet table.

The flag switch 96 on the other line starts the operation of the inlet and outlet conveyor motors 10 and 33. The inlet conveyors are operated by relays and contactors for the purpose of bringing the motors up to a predetermined speed to cause the tubes to move at a fast rate without skidding.

Figure 4:
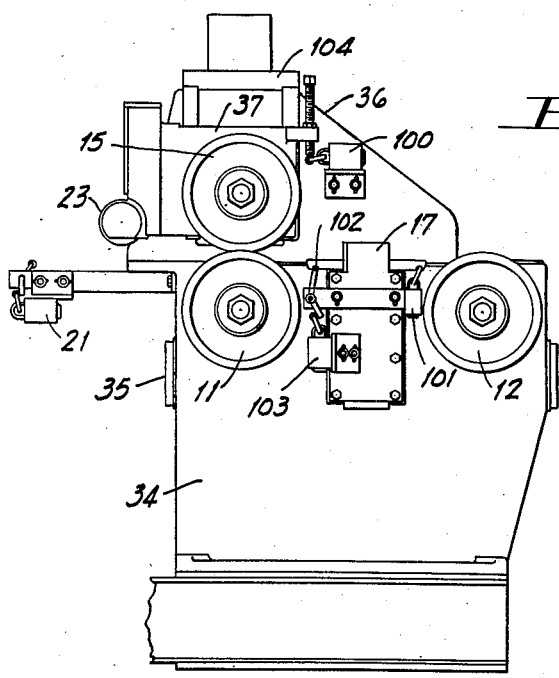
Fig. 4 is a view in side elevation of the measuring device and the cutoff machine.

The tubes travel along the inlet conveyor table operating the flag switches 19 and 20 which slow down the conveyors to a pre-set speed so that when the tubes hit the stop 17 they will be traveling at a minimum speed. The hitting of the stop 17 will operate the limit switch 103 which energizes a solenoid of the four-way valve for the purpose of lowering the pinch rolls 15 and 16 by hydraulically energizing the servomotor 104 to lower the crosshead 37. When the crosshead 37 drops to its lower position, to engage the pinch rolls 15 and 16 and the measuring rolls 23 and 24 to the tubing, the switch 100, as shown in Fig. 4, is actuated to drop the stop 17 and start the motors 10 and 33 to convey the tube to the cutoff machine and, at the same time, energize the magnetic coil 54 for the purpose of immediately picking up the pendulum and starting it around its circular path of movement with the rotary coil 54. The tube continues to move to the cutoff machine until the microswitch 80 becomes actuated owing to the setting of the position of the scanning arm 73 which, in turn, closes the chucks on the cutoff machine and they, in turn, initiate the cutting off action.

As previously stated this measuring machine may be used to measure off lengths of bar, pipe or strip stock. The strip may be metal or paper and the action need not be cut off but may be one of marking, forming, or shaping at predetermined spacings along the stock. It is immaterial how the operation of this measuring device is initiated. As shown, the lowering of the crosshead engages the measuring wheel with the stock and energizes the electromagnetic clutch member. The consistent starting position and the measurement are primarily dependent upon the energization of the electromagnetic clutch member as the wheel may always be in engagement with the stock which is continuously moving. However, the important feature is the consistent starting position obtained through the use of the weighted element such as the pendulum which when free swings to the bottom of its rotary path of movement ready for the electromagnetic clutch part to again be energized to pick up and rotate the weighted element until the sequence is completed, close the circuit and perform the operation on the stock thus measured out.

After the cutoff machine has completed its cycle and has initated the operation of the table rolls to remove the severed piece of pipe and to feed the next section of pipe thereto, the adjustable bumper to length gauge 9 functions to repeatedly operate the cutoff machine severing definite predetermined lengths of pipe until the whole of the pipe has been completely used, at which time the flag switch 101 becomes deenergized by the removal of a pipe therefrom and which in turn initiates the operation of the indexing machine to feed additional lengths of pipe to the lines represented by the rolls 3 and 4.

When the end of the pipe first engages the stop 17, it also actuates the limit switch paddle 102 that in turn functions to actuate the switch 103 that closes the circuit to energize the hydraulic servomotor 104 to lower the crosshead 37 and drop the pinch rolls and the measuring rolls into position. The switch 103 likewise inserts a resistance in series with the motors 10 to bring them to a stalling speed and allowing only sufficient voltage thereon to have them effective in urging the pipe against the stop 17.

I claim:

1. A machine for measuring lengths of stock comprising a rotary wheel mounted to engage the stock and be rotated through such engagement while the stock moves longitudinally, a circuit initiating switch means, a pair of revolvably mounted clutch parts, drive means between said rotary wheel and one of said clutch parts, a trip member actuated by the other clutch part to operate said circuit initiating switch means after the stock has traveled a predetermined length, and means to simultaneously bring said clutch parts into operative relation when said wheel is brought into engagement with the stock.

2. A machine for measuring and cutting lengths of stock comprising a rotary wheel mounted to engage the stock and be rotated through such engagement while the stock moves longitudinally, a circuit initiating switch means mounted for adjustment in an annular path, a pair of revolvably mounted clutch parts adjacent said switch, drive means between said rotary wheel and one of said clutch parts, a trip member actuated by the other clutch part to operate said circuit initiating switch means after the stock has traveled a predetermined length, means to simultaneously bring said clutch parts into operative relation when said wheel is brought into engagement with the stock, and means initiated by said circuit initiating switch means to operate on the measured length of stock.

3. A machine for measuring lengths of stock comprising operative means effective by a predetermined position of the stock, a rotary wheel mounted to engage the stock in the machine and be rotated through such engagement, a circuit initiating switch means, a pair of revolvably mounted clutch parts, drive means between said rotary wheel and one of said clutch parts, a trip member actuated by the other clutch part to operate said circuit initiating switch means after the stock has traveled a predetermined length, and means to simultaneously bring said clutch parts into operative relation when said wheel is brought into engagement with said stock when actuated by said operative means.

4. A cutoff mill comprising inlet and outlet tables having aligned rolls for supporting and carrying stock, a measuring machine and a cutoff machine with clamps positioned in tandem between the aligned inlet and outlet tables, a stock actuated flag switch means to start the rolls to feed the stock when depressed and to initiate the supply of stock when released, a retractable stock stop, a second stock actuated flag switch adjacent the discharge of the inlet table to slow down the stock feed rolls as the stock approaches said stop, a measuring roll, a third switch actuated when the stock engages said stop to lower the measuring roll into engagement with said stock and to cause withdrawing said stop to permit the stock to continue through the mill, scanner switch means actuated by the rotary movement of the measuring roll to stop the rolls after a predetermined longitudinal movement of the stock and to grip the stock in the clamps of the cutoff machine, means actuated by said clamps to operate the cutoff machine to sever the measured stock piece and retract the clamp to permit the remaining stock to be measured and severed.

5. An automatic cutoff mill comprising inlet and outlet tables having dual lines of rolls for supporting and conveying work, a dual cutoff machine positioned between the inlet and outlet tables to receive and deliver work thereto, a measuring machine between the inlet table and the cutoff machine and having dual lines of rolls corresponding with the inlet table rolls, a pinch roll, a measuring roll, a crosshead on said measuring machine carrying said pinch roll and said measuring roll for engaging the top of the workpiece of each line, a work stop for each line carried by said measuring machine, and series connected switch means actuated by the workpieces engaging both stops to lower said crosshead, and means to withdraw said stops when said measuring and pinch rolls engage the top of the workpieces.

6. A measuring device comprising a base, a roll carried by said base to support a workpiece, a pinch roll, a measuring roll, a movable head on said base carrying said pinch roll and said measuring roll for engagement with the top of a workpiece supported by said first roll, a retractable stop beyond the first roll, switch means actuated by the workpiece engaging said stop to initiate the lowering of the head to place the pinch roll and the measuring roll into engagement with the work, switch means actuated by the lowered head to withdraw the stop and convey the work, and a switch actuated by the measuring roll to stop the movement of the work after traveling a predetermined distance from said stop.

7. A machine for measuring lengths of stock moved past a measuring station comprising a wheel rotatably mounted at the measuring station and movable to engage and disengage the stock, a clutch part mounted for rotation on a given horizontal axis and connected to be driven by said wheel, a weighted element, guide means to direct said weighted element to revolve in a path about the horizontal axis of the clutch part and attractable by the latter to rotate in synchronism therewith but freely returnable when released to a common starting point in its path of movement, means to induce attraction of the weighted element by the clutch part to rotate therewith, and switch means mounted adjacent said guide means and actuated by the movement of the weighted element to a predetermined position to cause its release from the clutch part when the stock has traveled a predetermined distance and to initiate another action related to the predetermined stock length.

8. A machine for measuring lengths of stock moved past a measuring station comprising a wheel rotatably mounted at the measuring station and movable to engage and disengage the stock, a clutch part mounted for rotation on a given horizontal axis and connected to be driven by said wheel, a weighted element, guide means to direct said weighted element to revolve in a path about the horizontal axis of the clutch part and attractable by the latter to rotate in synchronism therewith but freely returnable when released to a common starting point in its path of movement, means actuated by the presentation of the stock to induce attraction of the weighted element by the clutch part to rotate therewith upon engagement of the stock by the wheel, and switch means mounted adjacent said guide means and actuated by the movement of the weighted element to a predetermined position to cause its release from the clutch part and disengage the wheel from the stock when the stock has traveled a predetermined distance and to initiate another action related to the predetermined stock length.

9. A machine for measuring lengths of stock moved past a measuring station comprising, a wheel rotatably mounted at the measuring station and movable to engage and disengage the stock, an annular electromagnet rotatably mounted on the machine and connected to be driven by said wheel, means to simultaneously engage the stock with said wheel and close a switch to energize said electromagnet, a pendulum mounted to freely revolve on the same axis as the electromagnet and closely adjacent thereto, said electromagnet locking and carrying said pendulum with it when energized and when de-energized permitting the pendulum to swing freely to a common starting point, and a trip means adjustably mounted to be actuated by the pendulum after traveling with the electromagnet a predetermined distance commensurate with a predetermined length of stock moved past the measuring station, said trip means de-energizing said electromagnet to release the pendulum and to initiate an operation on the length of stock measured.

ARTHUR H. LONG.

References Cited in the file of this patent

UNITED STATES PATENTS

| Number | Name | Date |
| --- | --- | --- |
| 1,259,968 | Edwards | Mar. 19, 1918 |
| 2,110,716 | Rhea | Mar. 8, 1938 |
| 2,118,944 | Purdy | May 31, 1938 |
| 2,298,492 | Longfield | Oct. 13, 1942 |
| 2,339,194 | Reichelt | Jan. 11, 1944 |
| 2,344,508 | Groll | Mar. 21, 1944 |